US012566081B2

(12) United States Patent
Kanda

(10) Patent No.: US 12,566,081 B2
(45) Date of Patent: Mar. 3, 2026

(54) POSITION DETECTING SWITCH, ACTUATOR, AND POSITION DETECTING METHOD

(71) Applicant: SMC CORPORATION, Tokyo (JP)

(72) Inventor: Yusuke Kanda, Tsukubamirai (JP)

(73) Assignee: SMC CORPORATION, Tokyo (JP)

( * ) Notice: Subject to any disclaimer, the term of this patent is extended or adjusted under 35 U.S.C. 154(b) by 156 days.

(21) Appl. No.: 18/417,512

(22) Filed: Jan. 19, 2024

(65) Prior Publication Data

US 2024/0247952 A1     Jul. 25, 2024

(30) Foreign Application Priority Data

Jan. 25, 2023     (JP) ................................. 2023-009409

(51) Int. Cl.
*G01D 5/14*          (2006.01)

(52) U.S. Cl.
CPC ......... *G01D 5/145* (2013.01); *G01D 2205/18* (2021.05)

(58) Field of Classification Search
CPC ........................... G01D 5/145; G01D 2205/18
See application file for complete search history.

(56) References Cited

U.S. PATENT DOCUMENTS

| | | | | |
|---|---|---|---|---|
| 11,326,868 B2 * | 5/2022 | Bidaux | ................... | G01D 5/246 |
| 11,444,564 B2 * | 9/2022 | Fujiwara | ................ | G01R 31/66 |
| 11,946,495 B2 * | 4/2024 | Uchiyama | ........... | F15B 15/2861 |
| 2003/0030431 A1 | 2/2003 | Reininger | | |
| 2003/0226594 A1 | 12/2003 | Miyazoe et al. | | |
| 2013/0034346 A1 * | 2/2013 | Ishikawa | ................ | G01D 5/145 396/89 |
| 2022/0252425 A1 | 8/2022 | Okada et al. | | |

FOREIGN PATENT DOCUMENTS

| | | |
|---|---|---|
| JP | 2003-527591 A | 9/2003 |
| JP | 2004-011859 A | 1/2004 |
| JP | 2007-224940 A | 9/2007 |
| JP | 2010-048698 A | 3/2010 |
| JP | 2010-071988 A | 4/2010 |
| JP | 2014-104876 A | 6/2014 |
| WO | WO-2019121988 A1 * | 6/2019 ........... H03K 17/952 |

OTHER PUBLICATIONS

Extended European Search Report issued Jul. 1, 2024, in corresponding European Patent Application No. 24152767.0, 7 pages.

* cited by examiner

*Primary Examiner* — Reena Aurora
(74) *Attorney, Agent, or Firm* — Oblon, McClelland, Maier & Neustadt, L.L.P.

(57) ABSTRACT

A position detecting switch detects the position of a movable body that is capable of moving in a predetermined direction, based on a magnet attached to the movable body. The position detecting switch is equipped with a magnetic sensor that detects the magnetism of the magnet, and outputs a detected value in accordance with the magnetism, a determination unit that determines whether or not the detected value lies within a predetermined range, and a setting unit that sets the predetermined range centrally around the detected value at a specified position which is a position of the movable body specified by an operator.

16 Claims, 12 Drawing Sheets

FIG. 6B

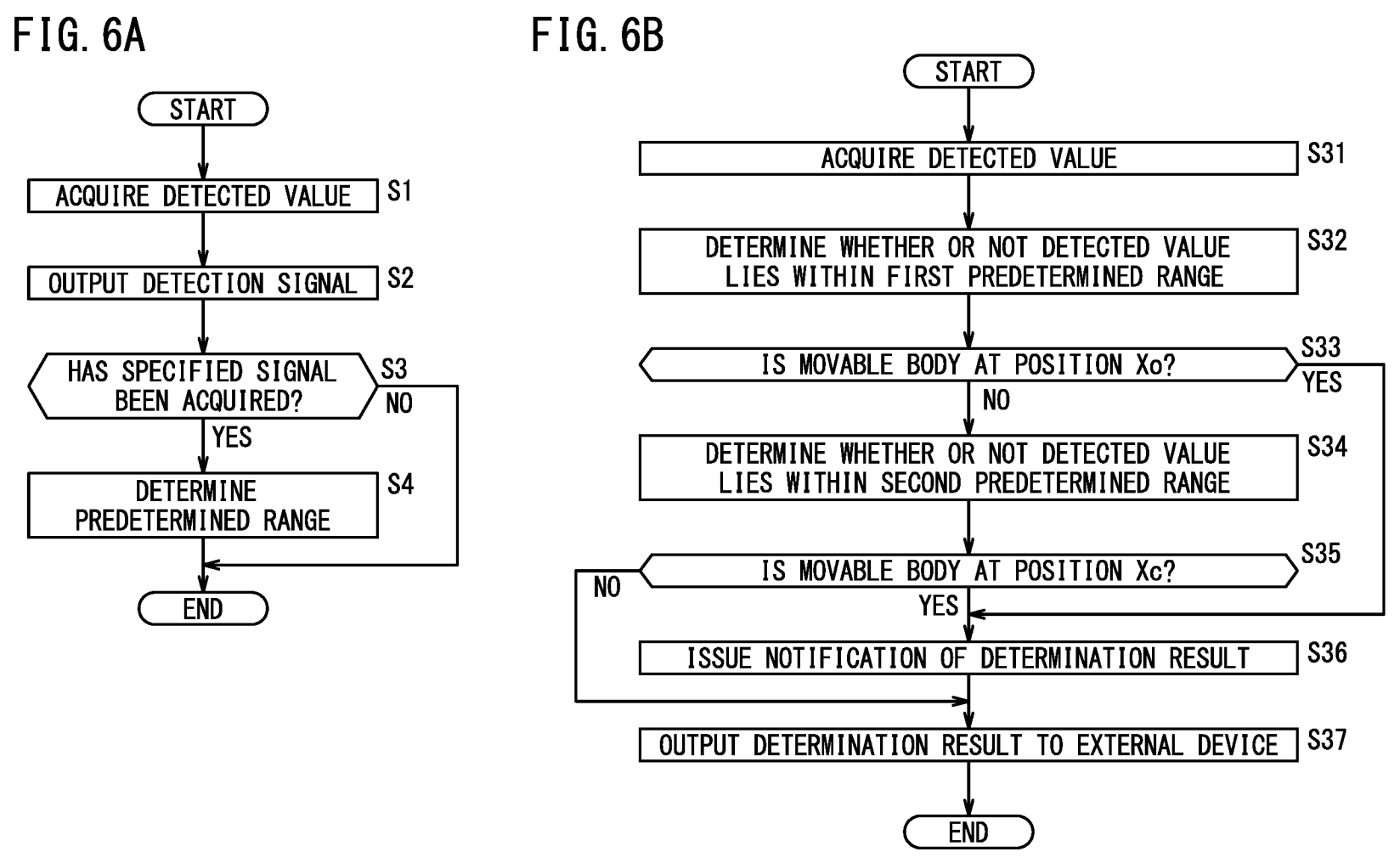

START

S31 ACQUIRE DETECTED VALUE

S32 DETERMINE WHETHER OR NOT DETECTED VALUE LIES WITHIN FIRST PREDETERMINED RANGE

S33 IS MOVABLE BODY AT POSITION Xo?
NO
YES

S34 DETERMINE WHETHER OR NOT DETECTED VALUE LIES WITHIN SECOND PREDETERMINED RANGE

S35 IS MOVABLE BODY AT POSITION Xc?
YES
NO

S36 ISSUE NOTIFICATION OF DETERMINATION RESULT

S37 OUTPUT DETERMINATION RESULT TO EXTERNAL DEVICE

END

FIG. 6A

START

S1 ACQUIRE DETECTED VALUE

S2 OUTPUT DETECTION SIGNAL

S3 HAS SPECIFIED SIGNAL BEEN ACQUIRED?
NO
YES

S4 DETERMINE PREDETERMINED RANGE

END

| | |
|---|---|
| 100 | |
| CONTROL DEVICE | |
| PROCESSING CIRCUIT | 150 |
| DETECTED VALUE ACQUISITION UNIT | 170 |
| DETERMINATION UNIT | 172 |
| SIGNAL ACQUISITION UNIT | 174 |
| SETTING UNIT | 176 |
| NOTIFICATION UNIT | 178 |
| OUTPUT UNIT | 180 |
| POSITION CALCULATION UNIT | 220 |
| STORAGE DEVICE | 152 |

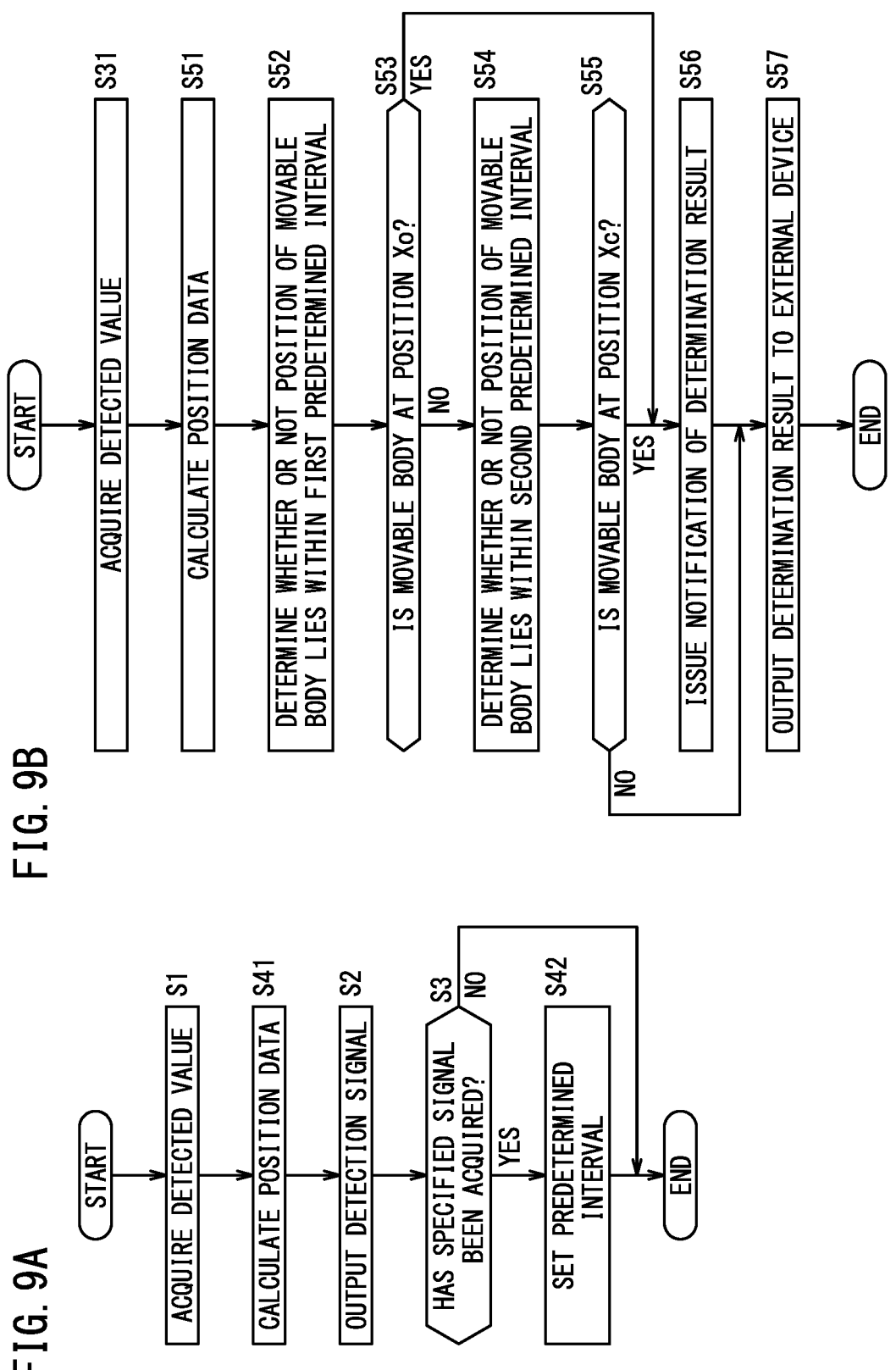

FIG. 9B

START

ACQUIRE DETECTED VALUE — S31

CALCULATE POSITION DATA — S51

DETERMINE WHETHER OR NOT POSITION OF MOVABLE BODY LIES WITHIN FIRST PREDETERMINED INTERVAL — S52

IS MOVABLE BODY AT POSITION Xo? — S53
YES
NO

DETERMINE WHETHER OR NOT POSITION OF MOVABLE BODY LIES WITHIN SECOND PREDETERMINED INTERVAL — S54

IS MOVABLE BODY AT POSITION Xc? — S55
YES
NO

ISSUE NOTIFICATION OF DETERMINATION RESULT — S56

OUTPUT DETERMINATION RESULT TO EXTERNAL DEVICE — S57

END

FIG. 9A

START

ACQUIRE DETECTED VALUE — S1

CALCULATE POSITION DATA — S41

OUTPUT DETECTION SIGNAL — S2

HAS SPECIFIED SIGNAL BEEN ACQUIRED? — S3
NO
YES

SET PREDETERMINED INTERVAL — S42

END

START

↓

ACQUIRE DETECTED VALUE    S1

↓

CALCULATE POSITION DATA    S41

↓

OUTPUT DETECTION SIGNAL    S2

↓

HAS SPECIFIED SIGNAL BEEN ACQUIRED?    S3
— NO
↓ YES

SET SPECIFIED VALUE TO PREDETERMINED VALUE    S71

↓

SET PREDETERMINED INTERVAL    S42

↓

END

START

↓

ACQUIRE SPECIFIED VALUE    S61

↓

STORE SPECIFIED VALUE    S62

↓

END

POSITION DETECTING SWITCH, ACTUATOR, AND POSITION DETECTING METHOD

CROSS-REFERENCE TO RELATED APPLICATIONS

This application is based upon and claims the benefit of priority from Japanese Patent Application No. 2023-009409 filed on Jan. 25, 2023, the contents of which are incorporated herein by reference.

BACKGROUND OF THE INVENTION

Field of the Invention

The present invention relates to a position detecting switch, an actuator, and a position detecting method.

Description of the Related Art

In JP 2014-104876 A, a position detecting device including a Hall IC is disclosed. The Hall IC serves as a sensor that detects the position of a magnet.

SUMMARY OF THE INVENTION

However, in the case that a deviation occurs between the designed position where the Hall IC is installed and the position where the Hall IC is actually installed, the accuracy in detecting the position of the magnet decreases.

The present invention has the object of solving the aforementioned problem.

A first aspect of the present invention is characterized by a position detecting switch configured to detect a position of a movable body that is movable in a predetermined direction, based on a magnet attached to the movable body, the position detecting switch including a magnetic sensor configured to detect magnetism of the magnet, and to output a detected value in accordance with the magnetism, a determination unit configured to determine whether or not the detected value lies within a predetermined range, and a setting unit configured to set the predetermined range centrally around the detected value corresponding to a specified position which is a position of the movable body specified by an operator.

A second aspect of the present invention is characterized by an actuator, including the position detecting switch according to the first aspect, the movable body, and an accommodation unit configured to accommodate the movable body in an interior portion of the accommodation unit, wherein the position detecting switch is attached to an outer surface of the accommodation unit.

A third aspect of the present invention is characterized by a position detecting method of detecting a position of a movable body that is movable in a predetermined direction, based on a magnet attached to the movable body, the position detecting method including a detection step of detecting magnetism of the magnet by a magnetic sensor, a determination step of determining whether or not a detected value detected in accordance with the magnetism lies within a predetermined range, and a setting step of setting the predetermined range centrally around the detected value corresponding to a specified position which is a position of the movable body specified by an operator.

According to the present invention, it is possible to prevent the accuracy in detecting the position from decreasing due to a reduced accuracy in the attachment of the magnetic sensor.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6A is a flowchart showing a range setting processing procedure performed by the control device of the position detecting switch;

FIG. 6B is a flowchart showing a position detecting processing procedure performed by the control device of the position detecting switch;

FIG. 9A is a flowchart showing a range setting processing procedure performed by the control device of the position detecting switch;

FIG. 9B is a flowchart showing a position detecting processing procedure performed by the control device of the position detecting switch;

DETAILED DESCRIPTION OF THE INVENTION

Figure 1:
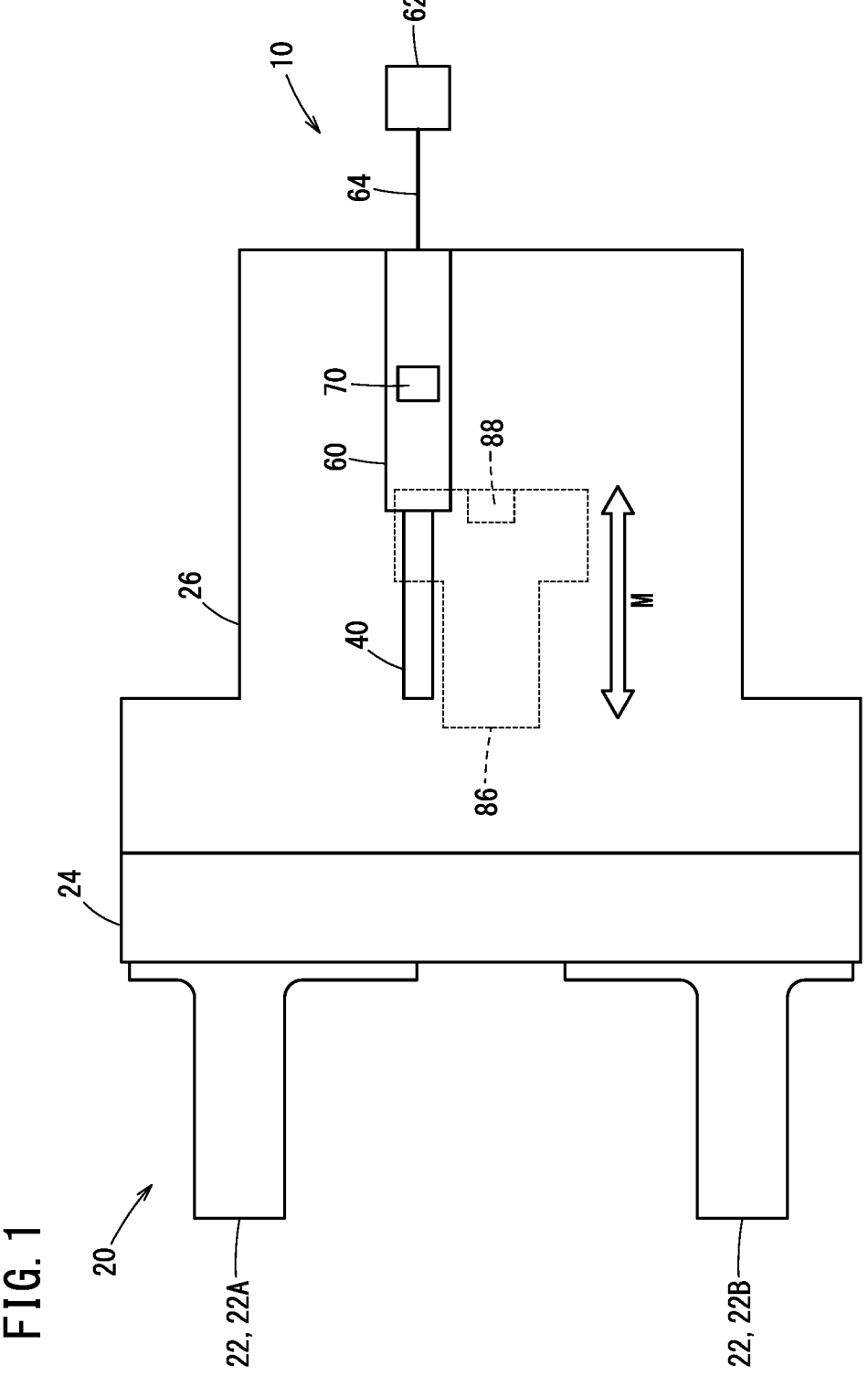
FIG. 1 is a diagram illustrating an actuator having a position detecting switch according to an embodiment.

FIG. 1 is a diagram illustrating an actuator 20 having a position detecting switch 10 according to an embodiment. The position detecting switch 10 detects the position of a movable body (to be described later) that is movable in a predetermined direction in an interior of the actuator 20. In the present embodiment, the actuator 20 is a gripper that grips a non-illustrated workpiece. However, the actuator 20 may be another device in which a movable body is incorporated, such as an air cylinder or the like.

The actuator 20 includes a pair of fingers 22, a finger supporting unit 24, and an accommodation unit 26. One from among the pair of fingers 22 may be referred to as a finger 22A, and the other may be referred to as a finger 22B. By moving the finger 22A and the finger 22B in a closing direction to come into close proximity toward each other, the workpiece is gripped by the pair of fingers 22. By moving the finger 22A and the finger 22B in an opening direction to separate away from each other, the workpiece is released from the pair of fingers 22.

The finger supporting unit 24 supports the pair of fingers 22 in a manner so as to be capable of opening and closing. The finger supporting unit 24 is attached to the accommodation unit 26. A groove 40 is formed in the outer surface of the accommodation unit 26. A main body 60 of the position detecting switch 10 is inserted into the groove 40 and thereby attached thereto.

The position detecting switch 10 includes the aforementioned main body 60, a connector 62 for making an external connection, and a cable 64. The cable 64 connects the main body 60 and the connector 62. A notification device 70 is provided on the main body 60. The notification device 70, for example, is an LED lamp.

The accommodation unit 26 serves to accommodate a movable body 86 and a magnet 88. The movable body 86 is capable of moving along a predetermined direction (direction of movement) M perpendicular to the opening and closing direction of the pair of fingers 22. The movable body 86 is moved, for example, by a pneumatic control.

The magnet 88 is attached to the movable body 86. Accordingly, when the movable body 86 is moved, the magnet 88 also moves in the direction of movement M together with the movable body 86. By the above-described position detecting switch 10 detecting the magnetism of the magnet 88, the position of the magnet 88 can be detected. Since the position of the movable body 86 is capable of being determined from the position of the magnet 88, hereinafter, the position of the magnet 88 may also be referred to as the position of the movable body 86.

In accordance with the movement of the movable body 86, the pair of fingers 22 opens and closes. In the case that the movable body 86 is closest to the pair of fingers 22, the pair of fingers 22 are in a maximally opened state. In the case that the movable body 86 is maximally spaced away from the pair of fingers 22, the pair of fingers 22 are in a maximally closed state.

Figure 2:
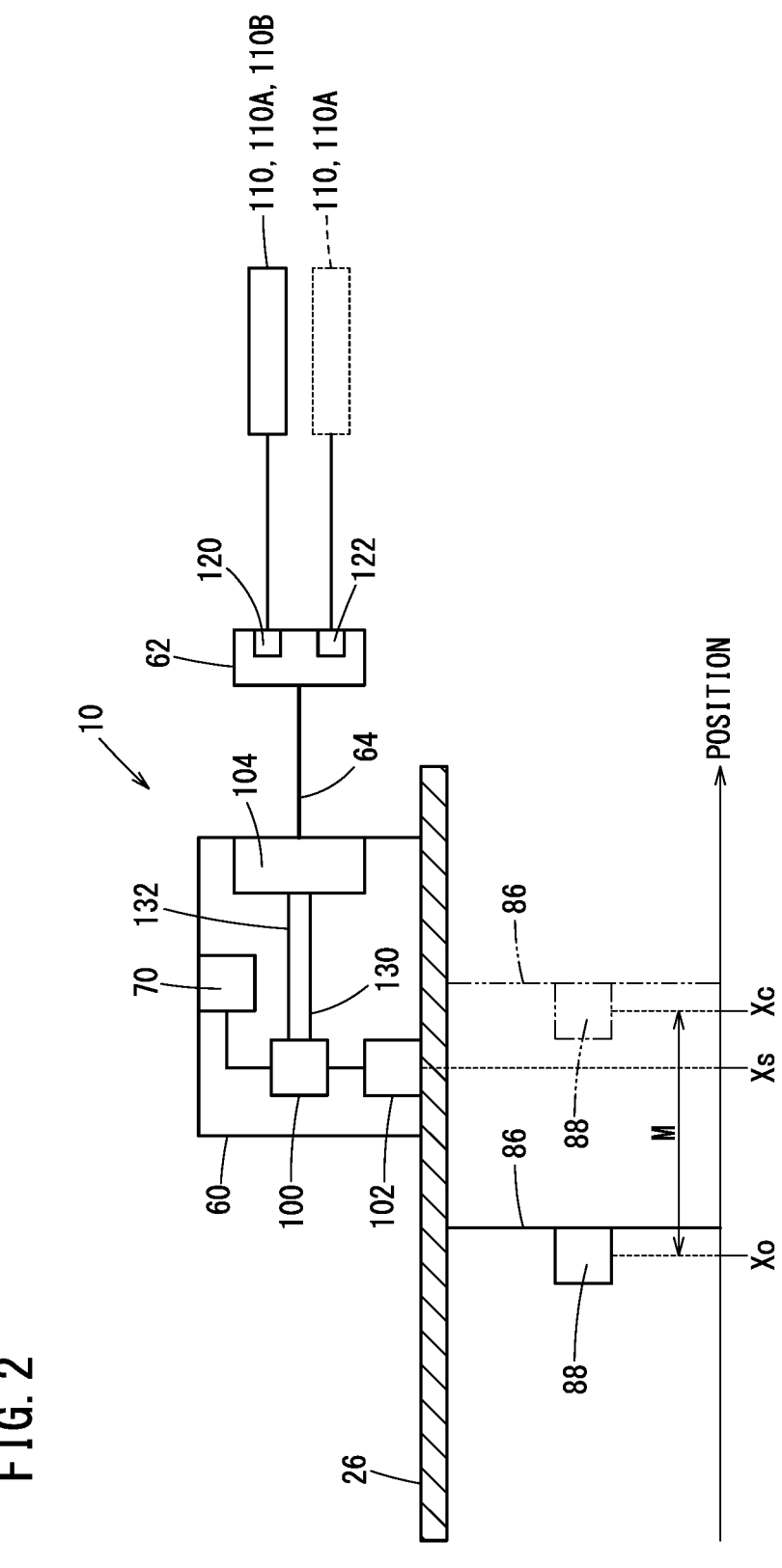
FIG. 2 is a diagram schematically showing a configuration of the position detecting switch.

FIG. 2 is a diagram schematically showing the configuration of the position detecting switch 10. The main body 60 of the position detecting switch 10, as described above, is attached to the outer surface of the accommodation unit 26. In addition to the above-described notification device 70, the main body 60 of the position detecting switch 10 further includes a control device 100, a magnetic sensor 102, and a communication module 104.

The magnetic sensor 102, for example, is an MR sensor or a TMR sensor that detects magnetism based on an electrical resistance that changes depending on a magnetoresistive effect. The magnetic sensor 102 may also be a Hall sensor that detects magnetism based on a voltage generated according to a Hall effect. The magnetic sensor 102 detects the magnetism of the magnet 88 that moves in the direction of movement M together with the movable body 86, and outputs a detected value D corresponding to the magnetism. The detected value D output by the magnetic sensor 102 changes depending on the position of the movable body 86.

The position in the aforementioned direction of movement M in the case that the pair of fingers 22 are maximally opened is defined as a position Xo. The position in the aforementioned direction of movement M in the case that the pair of fingers 22 are maximally closed is defined as a position Xc. A position Xs of the magnetic sensor 102 in the direction of movement M need not rely on the position Xo or the position Xc described above. As long as the magnetic sensor 102 is capable of detecting the magnetism of the magnet 88, the position Xs may be at any position. Accordingly, there is no need to pay attention to the accuracy in the attachment of the magnetic sensor 102.

The control device 100 operates in two types of modes. The two types of modes are a detection mode for detecting the position of the movable body 86, and a setting mode prior to the detection mode. The control device 100 in the detection mode determines whether or not the detected value D output by the magnetic sensor 102 lies within a predetermined range R. In the present embodiment, a first predetermined range Ro and a second predetermined range Rc are set as the predetermined range R that is used for such a determination. The first predetermined range Ro corresponds to a state in which the pair of fingers 22 are maximally opened. More specifically, in the case that the detected value D of the magnetic sensor 102 lies within the first predetermined range Ro, it can be estimated that the magnet 88 is at the position Xo.

The second predetermined range Rc corresponds to a state in which the pair of fingers 22 are maximally closed. More specifically, in the case that the detected value D of the magnetic sensor 102 lies within the second predetermined range Rc, it can be estimated that the magnet 88 is at the position Xc. Moreover, although the number of the predetermined ranges R in the present embodiment is two, the number of the predetermined ranges R may be one, or may be three or more. Since it is possible to set a plurality of the predetermined ranges R, one magnetic sensor 102 is capable of detecting a plurality of positions.

The control device 100 outputs the determination result to an external device 110 via the communication module 104, the cable 64, and the connector 62. The external device 110 to which the determination result is output, for example, is a PLC (Programmable Logic Controller) 110A.

The connector 62 includes one or a plurality of output terminals. In the present embodiment, since the number of the predetermined ranges R is two, as shown in FIG. 2, the connector 62 includes two output terminals 120 and 122. The output terminal 120 and the output terminal 122 output determination results made by the control device 100. For example, in the case it is determined that the detected value D of the magnetic sensor 102 lies within the first predetermined range Ro, the output terminal 120 outputs an output signal indicating such a determination result to the PLC 110A.

In the case it is determined that the detected value D of the magnetic sensor 102 lies within the second predetermined range Rc, the output terminal 122 outputs an output signal indicating such a determination result to the PLC 110A. In this manner, one of the predetermined ranges R used for the determination corresponds to one of the output terminals. By increasing the number of the output terminals that the connector 62 possesses, the number of the predetermined ranges R can be increased. Therefore, convenience is enhanced.

In FIG. 2, the PLC 110A to which the output signal from the output terminal 120 is output, and the PLC 110A to which the output signal from the output terminal 122 is output are shown as being separate devices. However, the output signals from the output terminal 120 and the output terminal 122 may be output to the same PLC 110A via a non-illustrated line concentration device.

The aforementioned predetermined range R is set in the following manner prior to carrying out the detection of the position of the movable body 86. Initially, the operator connects the external device 110 that is used for setting the predetermined range R to the output terminal 120. In this instance, the external device 110 that is connected to the output terminal 120 is a setting device 110B for the purpose of setting the predetermined range R.

The control device 100 of the position detecting switch 10 outputs a detection signal indicative of the detected value D of the magnetic sensor 102 to the setting device 110B via the output terminal 120. The detected value D changes in accordance with the movement of the magnet 88. A non-illustrated computation circuit of the setting device 110B calculates position data indicative of the position of the movable body 86 based on the detected value D indicated by the detection signal output from the control device 100.

The operator refers to the calculated position data, and by operating the setting device 110B, specifies a specific position of the movable body 86. Specifically, while referring to the calculated position data, the operator presses a push button (to be described later) on the setting device 110B at a time when the position of the movable body 86 has become the specific position. In the present embodiment, the specific position of the movable body 86 is defined as being the position Xo or the position Xc of the movable body 86. When the push button is pressed, the setting device 110B outputs a specified signal. The specified signal is input to the output terminal 120. In other words, there is no need to separately provide an input terminal for the specified signal. Therefore, the connector 62 can be made smaller in scale.

In the setting mode, the control device 100 acquires the specified signal input to the output terminal 120, via the cable 64 and the communication module 104. The control device 100 sets a predetermined range R for each of the specified positions. The specified position is a position X of the movable body 86 at a timing when the control device 100 has acquired a specified signal. The specified position in the present embodiment is the position Xo or the position Xc of the movable body 86. Accordingly, the first predetermined range Ro is set for the position Xo, and the second predetermined range Rc is set for the position Xc. A specific example of setting the predetermined range R will be described later using FIG. 4.

An output line 130 and a communication line 132 are connected between the control device 100 of the position detecting switch 10 and the communication module 104. The above-described output signal that is output to the PLC 110A is transferred from the control device 100 to the communication module 104 via the output line 130. Furthermore, the output signal, which is transferred to the connector 62 via the cable 64, is output to the PLC 110A from the above-described output terminal 120 or the output terminal 122, as noted previously.

The aforementioned detection signal that is output to the setting device 110B is transferred from the control device 100 to the communication module 104 via the communication line 132. Furthermore, the detection signal, which is transferred to the connector 62 via the cable 64, is output from the output terminal 120 to the setting device 110B, as noted previously. Further, the aforementioned specified signal output from the setting device 110B is input to the output terminal 120. Furthermore, the specified signal, which is transferred from the connector 62 to the communication module 104 via the cable 64, is acquired by the control device 100 via the communication line 132.

Figure 3:
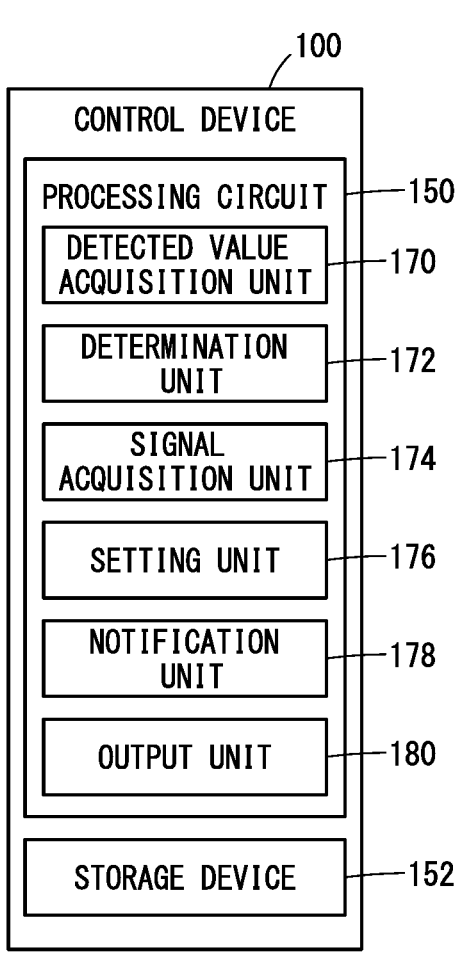
FIG. 3 is a block diagram schematically showing a configuration of a control device for the position detecting switch.

FIG. 3 is a block diagram schematically showing a configuration of the control device 100 for the position detecting switch 10. The control device 100 includes a processing circuit 150 and a storage device 152. The processing circuit 150 includes a processor such as a CPU or a GPU or the like. The storage device 152 includes a volatile memory such as a RAM or the like, and a nonvolatile memory such as a ROM or a flash memory or the like. The volatile memory is used as a working memory for the processor. The nonvolatile memory stores programs to be executed by the processor and other necessary data.

The processing circuit 150 includes a detected value acquisition unit 170, a determination unit 172, a signal acquisition unit 174, a setting unit 176, a notification unit 178, and an output unit 180. By the processing circuit 150 executing a program stored in the storage device 152, the detected value acquisition unit 170, the determination unit 172, the signal acquisition unit 174, the setting unit 176, the notification unit 178, and the output unit 180 are realized. At least a portion of the detected value acquisition unit 170, the determination unit 172, the signal acquisition unit 174, the setting unit 176, the notification unit 178, and the output unit 180 may be realized by an integrated circuit such as an ASIC or an FPGA or the like, or alternatively, by an electronic circuit including a discrete device.

The detected value acquisition unit 170 acquires from the magnetic sensor 102 the detected value D of the magnetic sensor 102. In the case that the setting device 110B is connected as the external device 110 to the connector 62, the detected value acquisition unit 170 is capable of outputting a detection signal indicative of the detected value D to the setting device 110B.

The determination unit 172 determines whether or not the detected value D output by the magnetic sensor 102 lies within the predetermined range R. The notification unit 178 causes the notification device 70 to issue a notification of the determination result made by the determination unit 172. In the case that the notification device 70 is an LED lamp, when it is determined that the detected value D lies within the predetermined range R, the LED lamp is turned on. When it is determined that the detected value D does not lie within the predetermined range R, the LED lamp is turned off.

The output unit 180 outputs to the external device 110 (the PLC 110A) an output signal indicative of the determination result made by the determination unit 172. When it is determined that the detected value D lies within the predetermined range R, a notification to that effect is issued to the operator by the external device 110.

The signal acquisition unit 174 acquires the specified signal from the operator, from the external device 110 (the setting device 110B). The setting unit 176 sets the predetermined range R using the detected value D at the specified position at a timing when the specified signal has been acquired.

Figure 4:
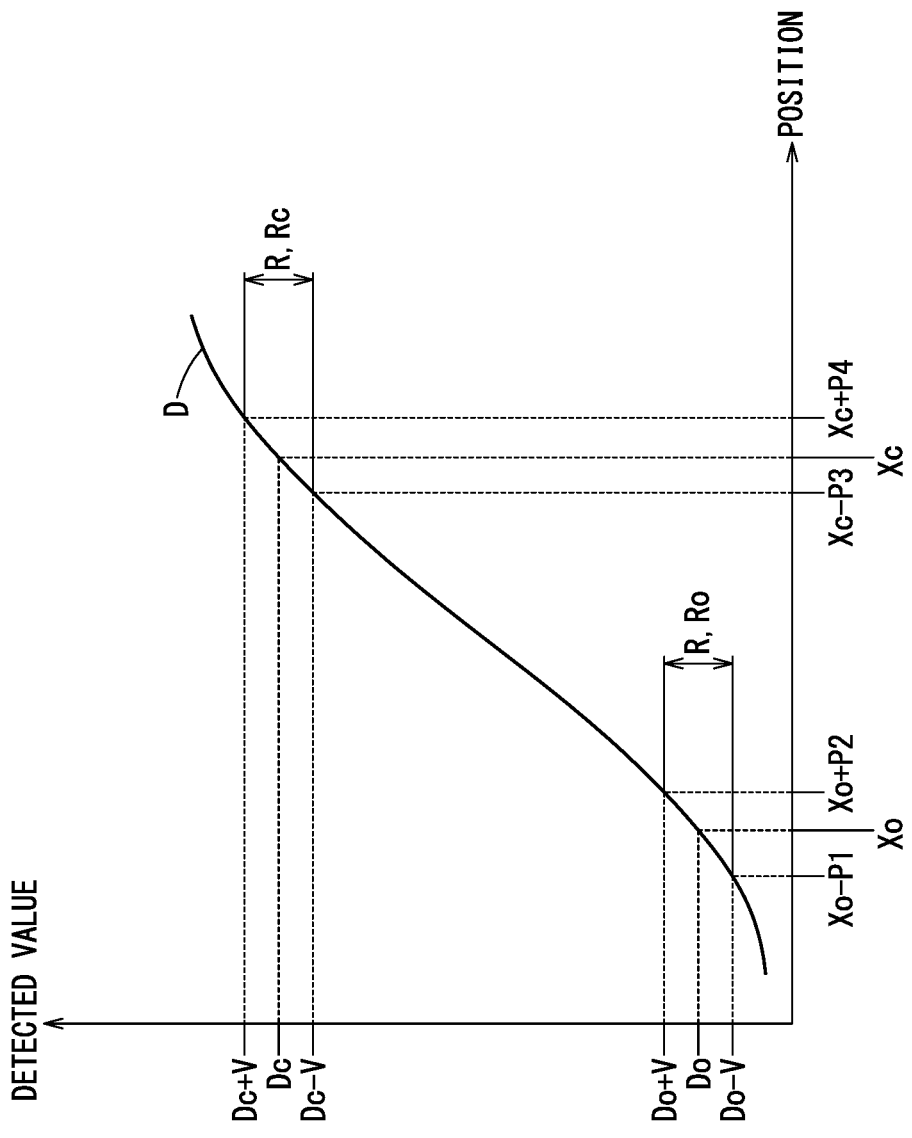
FIG. 4 is a diagram illustrating detected values of the position detecting switch.

FIG. 4 is a diagram illustrating the detected value D of the position detecting switch 10. In the example shown in FIG. 4, in the case that the movable body 86 is at the position Xo, the value of the detected value D is Do. It shall be assumed that the position Xo of the movable body 86 is specified by the operator as the aforementioned specified position. In that case, the setting unit 176 of the control device 100 sets the predetermined range R (the first predetermined range Ro) centrally around the detected value D=Do at the specified position. If the operator specifies one specified position, the predetermined range R is set. Therefore, setting of the predetermined range R is simple to perform.

Specifically, the range of the detected value D, in which the magnitude of the difference from the detected value D corresponding to the position Xo (which is a specified position) lies within a predetermined value V, is set as the first predetermined range Ro. A lower limit value and an upper limit value of the first predetermined range Ro are the detected value D=Do−V and the detected value D=Do+V, respectively. The positions of the movable body 86 corresponding to the detected value D=Do−V and the detected value D=Do+V are Xo−P1 and Xo+P2, respectively. Accordingly, in the case that the position of the movable body 86 lies within the range of Xo−P1 to Xo+P2, it is determined that the detected value D lies within the first predetermined range Ro.

In the example shown in FIG. 4, in the case that the movable body 86 is at the position Xc, the value of the detected value D is Dc. It shall be assumed that the position Xc of the movable body 86 is specified by the operator as the aforementioned specified position. In that case, the setting unit 176 of the control device 100 sets the predetermined range R (the second predetermined range Rc) centrally around the detected value D=Dc at the specified position.

Specifically, the range of the detected value D, in which the magnitude of the difference from the detected value D corresponding to the position Xc (which is a specified position) lies within a predetermined value V, is set as the second predetermined range Rc. A lower limit value and an upper limit value of the second predetermined range Rc are the detected value D=Dc−V and the detected value D=Dc+V, respectively. The positions of the movable body 86 corresponding to the detected value D=Dc−V and the detected value D=Dc+V are Xc−P3 and Xc+P4, respectively. Accordingly, in the case that the position of the movable body 86 lies within the range of Xc−P3 to Xc+P4, it is determined that the detected value D lies within the second predetermined range Rc.

Figures 5A, 5B:
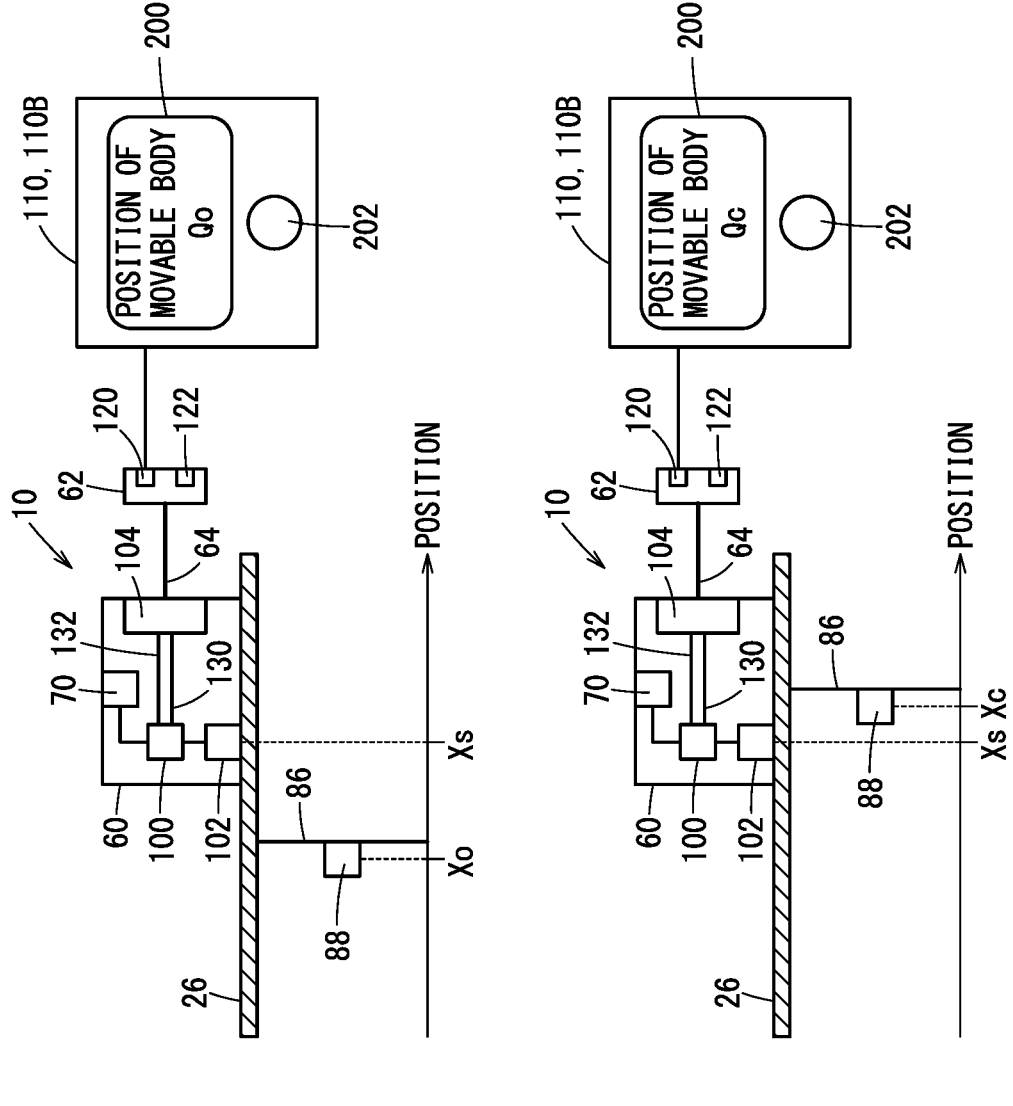
FIG. 5A is a diagram showing an example of connection between the position detecting switch and an external device.
FIG. 5B is a diagram showing an example of connection between the position detecting switch and an external device.

FIG. 5A and FIG. 5B are diagrams showing examples of connections between the position detecting switch 10 and the external device 110. In FIG. 5A and FIG. 5B, the external device 110 is the setting device 110B for setting the predetermined range R. Setting of the predetermined range R is carried out prior to carrying out the detection of the position of the movable body 86. The setting device 110B, in addition to the aforementioned non-illustrated computation circuit, further includes a display unit 200 and a push button 202. The setting device 110B, as described above, is connected to the output terminal 120.

The display unit 200 of the setting device 110B, in accordance with the movement of the movable body 86, displays the position data calculated by the computation circuit of the setting device 110B. The operator refers to the position data displayed on the display unit 200 of the setting device 110B, and presses the push button 202 of the setting device 110B at a time when the data indicates the specific position. When the push button 202 is pressed, the setting device 110B outputs the aforementioned specified signal.

FIG. 5A shows a state in which the movable body 86 is at the aforementioned position Xo at which the pair of fingers 22 are maximally opened. In the case that the movable body 86 is at the aforementioned position Xo, the position data Qo, which is obtained by the calculation made by the computation circuit of the setting device 110B, is displayed on the display unit 200 as the position of the movable body 86. More specifically, the position data Qo indicates that the movable body 86 is at the aforementioned position Xo. In the case that the position data Qo is displayed, the operator presses the push button 202 of the setting device 110B. By the operator pressing the push button 202, the aforementioned specified signal is output.

The signal acquisition unit 174 of the control device 100 of the position detecting switch 10 acquires the specified signal. The setting unit 176 sets the first predetermined range Ro taking, as the specified position, the position Xo of the movable body 86 at the timing when the specified signal is acquired.

FIG. 5B shows a state in which the movable body 86 is at the aforementioned position Xc at which the pair of fingers 22 are maximally closed. In the case that the movable body 86 is at the aforementioned position Xc, the position data Qc, which is obtained by the calculation made by the computation circuit of the setting device 110B, is displayed on the display unit 200 as the position of the movable body 86. More specifically, the position data Qc indicates that the movable body 86 is at the aforementioned position Xc. In the case that the position data Qc is displayed, the operator presses the push button 202 of the setting device 110B. By the operator pressing the push button 202, the aforementioned specified signal is output.

The signal acquisition unit 174 of the control device 100 of the position detecting switch 10 acquires the specified signal. The setting unit 176 sets the second predetermined range Rc taking, as the specified position, the position Xc of the movable body 86 at the timing at which the specified signal is acquired.

FIG. 6A is a flowchart showing a range setting processing procedure performed by the control device 100 of the position detecting switch 10. The present processing procedure is periodically performed, for example, by the processing circuit 150 included in the control device 100, in a setting mode prior to detecting the position of the movable body 86. When the present processing procedure is initiated, in step S1, the detected value acquisition unit 170 acquires from the magnetic sensor 102 the detected value D of the magnetic sensor 102. Moreover, during execution of the present processing procedure, the movable body 86 is moving in the direction of movement M. In step S2, the detected value acquisition unit 170 outputs a detection signal indicative of the detected value D to the external device 110 (the setting device 110B).

In step S3, the signal acquisition unit 174 determines whether or not a specified signal specified by the operator has been acquired from the external device 110 (the setting device 110B). In the case it has become YES in step S3, the present processing procedure proceeds to step S4. In the case it has become NO in step S3, the present processing procedure comes to an end. In step S4, the setting unit 176 sets the predetermined range R using the detected value D acquired in step S1. When the process of step S4 is completed, the present processing procedure comes to an end.

FIG. 6B is a flowchart showing a position detecting processing procedure performed by the control device 100 of the position detecting switch 10. The present processing procedure is periodically performed, for example, by the processing circuit 150 included in the control device 100, in a detection mode. When the present processing procedure is initiated, in step S31, the detected value acquisition unit 170 acquires from the magnetic sensor 102 the detected value D of the magnetic sensor 102.

In step S32, the determination unit 172 determines whether or not the detected value D acquired in step S31 lies within the first predetermined range Ro corresponding to the state in which the pair of fingers 22 are maximally opened. In step S33, based on the determination result carried out in step S32, the determination unit 172 determines whether or not the movable body 86 is at the position Xo at which the pair of fingers 22 are maximally opened.

In the case it is determined in step S32 that the detected value D lies within the first predetermined range Ro, then in step S33, it is determined that the movable body 86 is at the position Xo. In the case it is determined in step S32 that the detected value D does not lie within the first predetermined range Ro, then in step S33, it is determined that the movable body 86 is not at the position Xo. In the case it has become YES in step S33, the present processing procedure proceeds to step S36. In the case it has become NO in step S33, the present processing procedure proceeds to step S34.

In step S34, the determination unit 172 determines whether or not the detected value D acquired in step S31 lies within the second predetermined range Rc corresponding to the state in which the pair of fingers 22 are maximally closed. In step S35, based on the determination result carried out in step S34, the determination unit 172 determines whether or not the movable body 86 is at the position Xc at which the pair of fingers 22 are maximally closed.

In the case it is determined in step S34 that the detected value D lies within the second predetermined range Rc, then in step S35, it is determined that the movable body 86 is at the position Xc. In the case it is determined in step S34 that the detected value D does not lie within the second predetermined range Rc, then in step S35, it is determined that the movable body 86 is not at the position Xc. In the case it has become YES in step S35, the present processing procedure proceeds to step S36. In the case it has become NO in step S35, the present processing procedure proceeds to step S37.

In step S36, the notification unit 178 causes the notification device 70 to issue a notification of the determination result made by the determination unit 172. As the determination result, a notification is issued to the effect that the movable body 86 has been determined to be at the position Xo in step S33, or alternatively, that the movable body 86 has been determined to be at the position Xc in step S35.

In step S37, the output unit 180 outputs to the external device 110 (the PLC 110A) an output signal indicative of the determination result made by the determination unit 172. When the process of step S37 is completed, the present processing procedure comes to an end.

Exemplary Modifications

The above-described embodiment may be modified in the following manner.

Exemplary Modification 1

In the above-described embodiment, in order to set the predetermined range R, the detected value acquisition unit 170 of the control device 100 outputs to the setting device 110B a detection signal indicative of the detected value D of the magnetic sensor 102. However, a detection signal indicative of the position data Q of the movable body 86 may be output.

Figure 7:
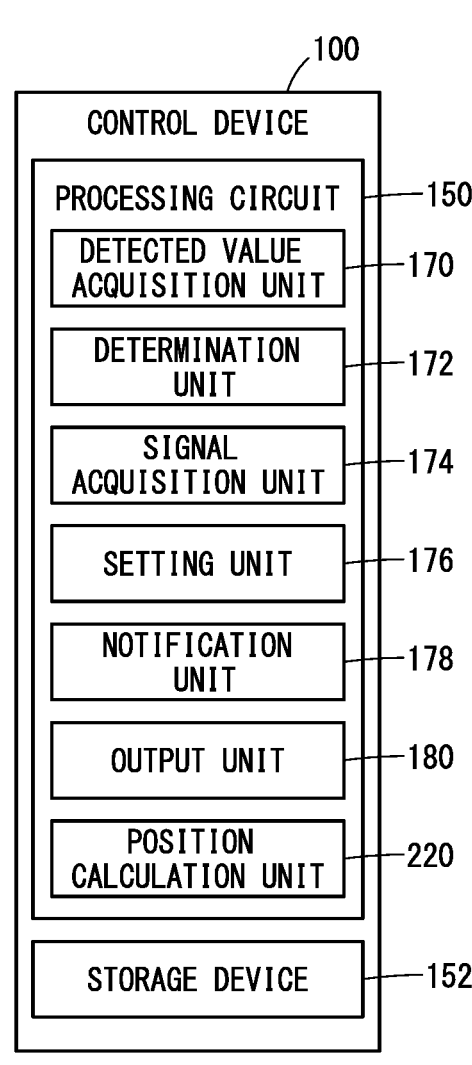
FIG. 7 is a diagram schematically showing a configuration of a control device for the position detecting switch according to Exemplary Modification 1.

FIG. 7 is a diagram schematically showing a configuration of the control device 100 for the position detecting switch 10 according to Exemplary Modification 1. The processing circuit 150 of the control device 100 shown in FIG. 7 differs from the processing circuit 150 of the control device 100 shown in FIG. 3, in that it further includes a position calculation unit 220. Hereinafter, descriptions that overlap or are duplicative with those of the processing circuit 150 of the control device 100 shown in FIG. 3 will be omitted.

The position calculation unit 220 calculates the position data Q indicative of the position of the movable body 86 based on the detected value D acquired by the detected value acquisition unit 170. The detected value acquisition unit 170 does not output a detection signal indicative of the detected value D, but outputs to the setting device 110B a detection signal indicative of the position data Q calculated by the position calculation unit 220. In that case, the computation circuit of the setting device 110B displays the position data Q on the display unit 200.

Figure 8:
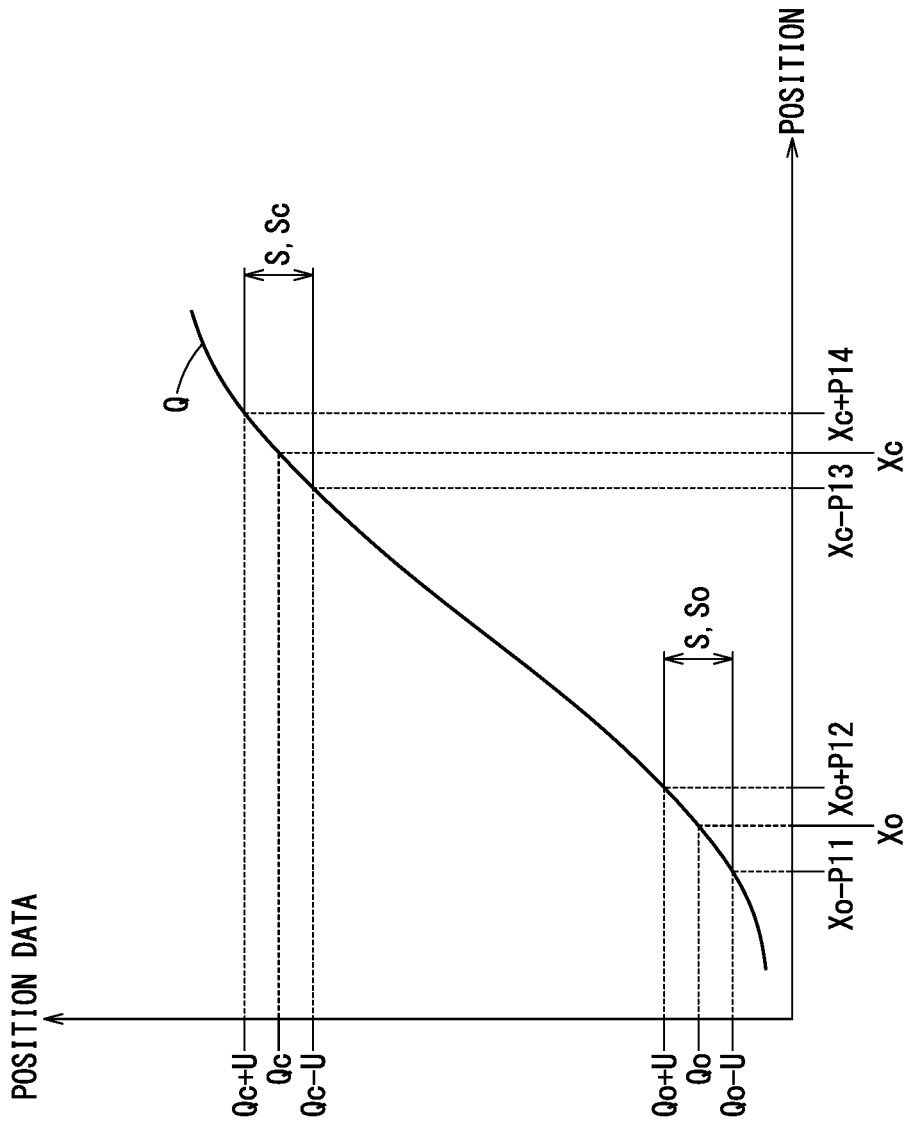
FIG. 8 is a diagram illustrating position data of a movable body.

FIG. 8 is a diagram illustrating the position data Q of the movable body 86. In the example shown in FIG. 8, in the case that the movable body 86 is at the position Xo, the value of the position data Q is Qo. It shall be assumed that the position Xo of the movable body 86 is specified by the operator as the aforementioned specified position. In that case, the setting unit 176 of the control device 100 sets the predetermined interval S (the first predetermined interval So) centrally around the position data Q=Qo at the specified position. If the operator specifies one specified position, the predetermined interval S is set. Therefore, setting of the predetermined interval S is simple to perform.

Specifically, a range of the position data Q, in which the magnitude of the difference from the position data Q corresponding to the position Xo (which is a specified position) lies within a predetermined value U, is set as the first predetermined interval So. A lower limit value and an upper limit value of the first predetermined interval So are the position data Q=Qo−U and the position data Q=Qo+U. The positions of the movable body 86 corresponding to the position data Q=Qo−U and the position data Q=Qo+U are Xo−P11 and Xo+P12, respectively. Accordingly, in the case that the position of the movable body 86 lies within the range of Xo−P11 to Xo+P12, it is determined that the position data Q lies within the first predetermined interval So.

In the example shown in FIG. 8, in the case that the movable body 86 is at the position Xc, the value of the position data Q is Qc. It shall be assumed that the position Xc of the movable body 86 is specified by the operator as the aforementioned specified position. In that case, the setting unit 176 of the control device 100 sets the predetermined interval S (the second predetermined interval Sc) centrally around the position data Q=Qc at the specified position.

Specifically, a range of the position data Q, in which the magnitude of the difference from the position data Q corresponding to the position Xc (which is a specified position) lies within a predetermined value U, is set as the second predetermined interval Sc. A lower limit value and an upper limit value of the second predetermined interval Sc are the position data Q=Qc−U and the position data Q=Qc+U. The positions of the movable body 86 corresponding to the position data Q=Qc−U and the position data Q=Qc+U are Xc−P13 and Xc+P14, respectively. Accordingly, in the case that the position of the movable body 86 lies within the range of Xc−P13 to Xc+P14, it is determined that the position data Q lies within the second predetermined interval Sc.

FIG. 9A is a flowchart showing a range setting processing procedure performed by the control device 100 of the position detecting switch 10. The present processing procedure is periodically performed, for example, by the processing circuit 150 included in the control device 100, in a setting mode prior to detecting the position of the movable body 86. Moreover, during execution of the present processing procedure, the movable body 86 is moving in the direction of movement M. Among the steps in the processing procedure shown in FIG. 9A, descriptions of those steps which are designated by the same reference numerals as the steps of the processing procedure shown in FIG. 6A will be omitted.

When the process of step S1 is completed, in step S41, the position calculation unit 220 calculates the position data Q indicative of the position of the movable body 86 based on the detected value D acquired in step S1. When the process of step S41 is completed, the process proceeds to step S2.

In the case it has become YES in step S3, then in step S42, the setting unit 176 sets the predetermined interval S using the position data Q that has been calculated in step S41. Setting of the predetermined interval S corresponds to the setting unit 176 having set the predetermined range R using the detected value D. When the process of step S42 is completed, the present processing procedure comes to an end.

FIG. 9B is a flowchart showing a position detecting processing procedure performed by the control device 100 of the position detecting switch 10. The present processing procedure is periodically performed, for example, by the processing circuit 150 included in the control device 100, in a detection mode. When the present processing procedure is initiated, in step S31, the detected value acquisition unit 170 acquires from the magnetic sensor 102 the detected value D of the magnetic sensor 102. In step S51, the position calculation unit 220 calculates the position data Q indicative of the position of the movable body 86 based on the detected value D acquired in step S31.

In step S52, the determination unit 172 determines whether or not the position data Q calculated in step S51 lies within the first predetermined interval So corresponding to the maximally opened state of the pair of fingers 22. The fact of it being determined that the position data Q lies within the first predetermined interval So in step S52 corresponds to, in the above-described embodiment, the determination unit 172 determining that the detected value D lies within the first predetermined range Ro.

In step S53, based on the determination result carried out in step S52, the determination unit 172 determines whether or not the movable body 86 is at the position Xo at which the pair of fingers 22 are maximally opened. In the case it is determined in step S52 that the position data Q lies within the first predetermined interval So, then in step S53, it is determined that the movable body 86 is at the position Xo. In the case it is determined in step S52 that the position data Q does not lie within the first predetermined interval So, then in step S53, it is determined that the movable body 86 is not at the position Xo.

In the case it has become YES in step S53, the present processing procedure proceeds to step S56. In the case it has become NO in step S53, the present processing procedure proceeds to step S54.

In step S54, the determination unit 172 determines whether or not the position data Q acquired in step S51 lies within the second predetermined interval Sc corresponding to the maximally closed state of the pair of fingers 22. The fact of it being determined that the position data Q lies within the second predetermined interval Sc in step S54 corresponds to, in the above-described embodiment, the determination unit 172 determining that the detected value D lies within the second predetermined range Rc.

In step S55, based on the determination result carried out in step S54, the determination unit 172 determines whether or not the movable body 86 is at the position Xc at which the pair of fingers 22 are maximally closed. In the case it is determined in step S54 that the position data Q lies within the second predetermined interval Sc, then in step S55, it is determined that the movable body 86 is at the position Xc. In the case it is determined in step S54 that the position data Q does not lie within the second predetermined interval Sc, then in step S55, it is determined that the movable body 86 is not at the position Xc.

In the case it is determined in step S54 that the position data Q lies within the second predetermined interval Sc, then in step S55, it is determined that the movable body 86 is at the position Xc. In the case it is determined in step S54 that the position data Q does not lie within the second predetermined interval Sc, then in step S55, it is determined that the movable body 86 is not at the position Xc. In the case it has become YES in step S55, the present processing procedure proceeds to step S56. In the case it has become NO in step S55, the present processing procedure proceeds to step S57.

In step S56, the notification unit 178 causes the notification device 70 to issue a notification of the determination result made by the determination unit 172. As the determination result, a notification is issued to the effect that the movable body 86 has been determined to be at the position Xo in step S53, or alternatively, that the movable body 86 has been determined to be at the position Xc in step S55.

In step S57, the output unit 180 outputs to the external device 110 (the PLC 110A) an output signal indicative of the determination result made by the determination unit 172. When the process of step S57 is completed, the present processing procedure comes to an end.

Exemplary Modification 2

Figure 10:
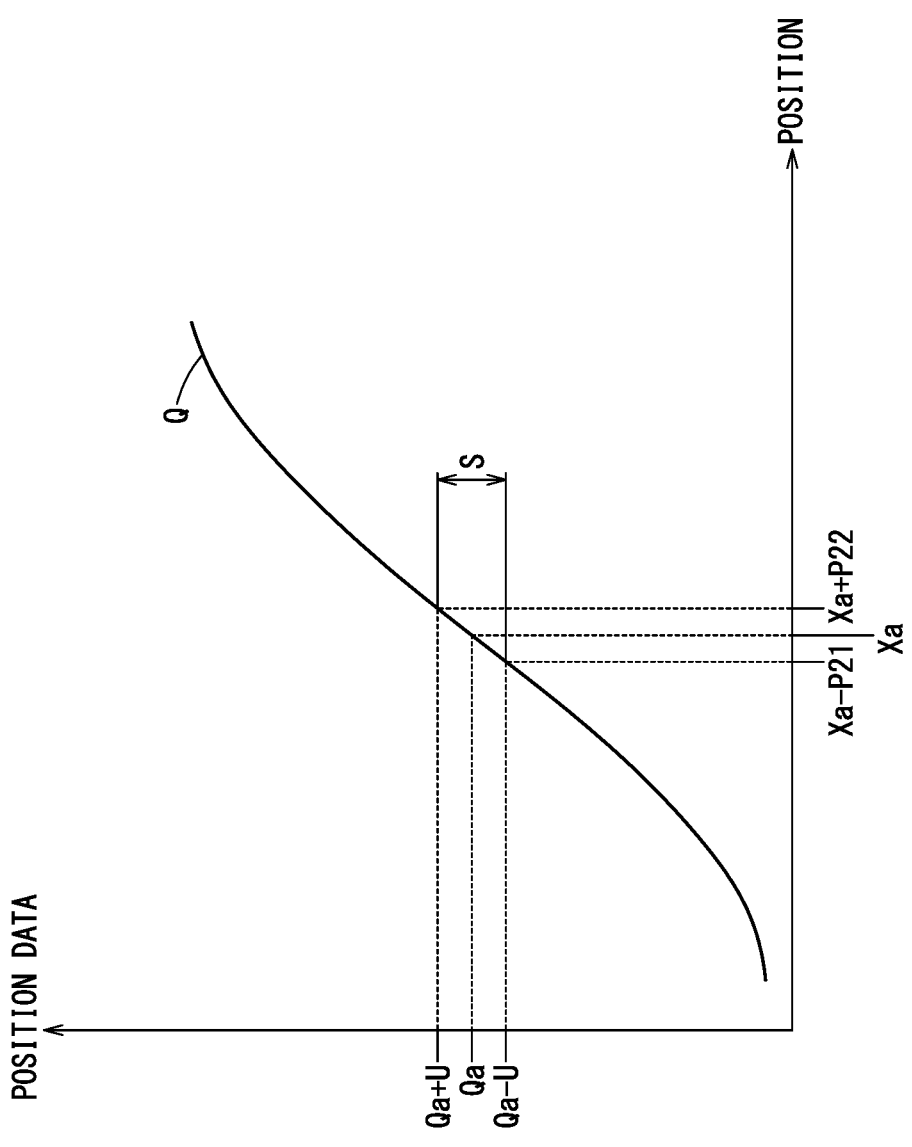
FIG. 10 is a diagram illustrating position data of a movable body calculated by the position detecting switch according to Exemplary Modification 2.

In the above-described Exemplary Modification 1, the operator specifies a plurality of the specified positions. However, the operator may specify one specified position. FIG. 10 is a diagram illustrating the position data Q of the movable body 86 calculated by the position detecting switch 10 according to Exemplary Modification 2. In the example shown in FIG. 10, in the case that the movable body 86 is at the position Xa, the value of the position data Q is Qa. It shall be assumed that the position Xa of the movable body 86 is specified by the operator as the aforementioned specified position. In that case, the setting unit 176 of the control device 100 sets the predetermined interval S centrally around the position data Q=Qa at the specified position.

Specifically, a range of the position data Q, in which the magnitude of the difference from the position data Q corresponding to the position Xa, which is a specified position, lies within a predetermined value U, is set as the predetermined interval S. A lower limit value and an upper limit value of the predetermined interval S are the position data Q=Qa−U and the position data Q=Qa+U. The positions of the movable body 86 corresponding to the position data Q=Qa−U and the position data Q=Qa+U are Xa−P21 and Xa+P22, respectively. Accordingly, in the case that the position of the movable body 86 lies within the range of Xa−P21 to Xa+P22, it is determined that the position data Q lies within the predetermined interval S.

According to the present modification, if the operator specifies one specified position from among the positions to which the movable body 86 is capable of moving, the predetermined interval S is set. Regardless of which position is the specified position, the magnetic sensor 102 can be attached to any arbitrary position. Accordingly, the accuracy in the attachment of the magnetic sensor 102 is not required. Regardless of the position where the magnetic sensor 102 is attached, any arbitrary position to which the movable body 86 is capable of moving can be specified as the specified position.

Exemplary Modification 3

In the above-described Exemplary Modification 1 and the Exemplary Modification 2, the lower limit value and the upper limit value of the predetermined interval S are values such that the magnitude of the difference from the position data Q corresponding to the specified position becomes the predetermined value U. However, a hysteresis may be set for each of the lower limit value and the upper limit value of the predetermined interval S. In the present exemplary modification, an example will be described in which the hysteresis is set for the predetermined interval S shown in FIG. 10 of the Exemplary Modification 2.

Figure 11:
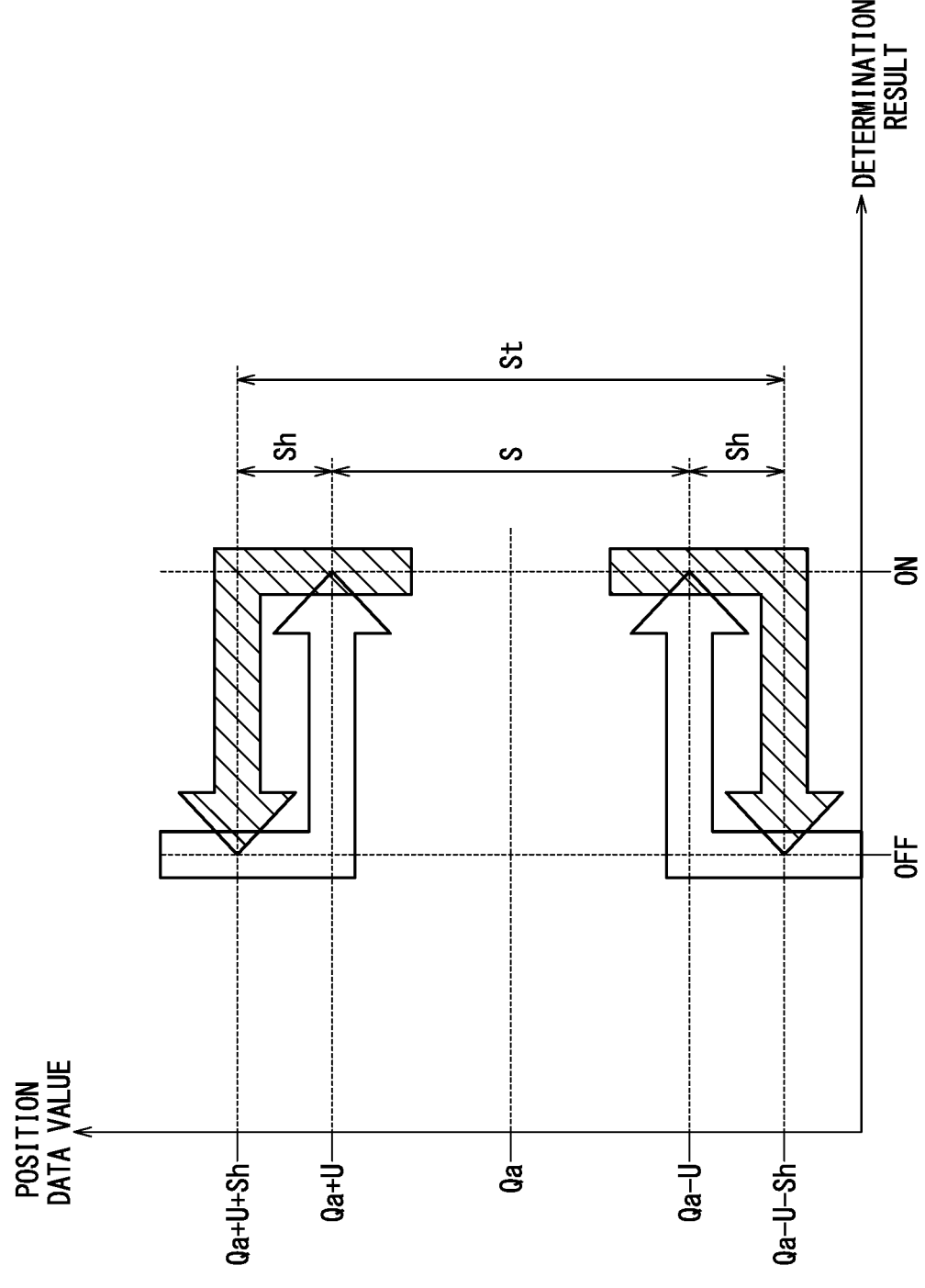
FIG. 11 is a diagram illustrating a hysteresis corresponding to a predetermined interval set by the position detecting switch according to Exemplary Modification 3.

FIG. 11 is a diagram illustrating the hysteresis Sh corresponding to the predetermined interval S set by the position detecting switch 10 according to the Exemplary Modification 3. In this instance, in the case that the determination unit 172 of the control device 100 determines that the detected value D output by the magnetic sensor 102 lies within the predetermined interval S, the determination result is regarded as being ON. In the case that the determination unit 172 determines that the detected value D output by the magnetic sensor 102 lies outside of the predetermined interval S, the determination result is regarded as being OFF.

In the case that the position data Q changes from being a value outside of the predetermined interval S to a value being within the predetermined interval S, the determination result changes from OFF to ON. In that case, the lower limit value and the upper limit value of the predetermined interval S are the position data Q=Qa−U and the position data Q=Qa+U, respectively, in the same manner as in the Exemplary Modification 2.

A predetermined interval St in a case that the determination result changes from ON to OFF is obtained by setting the hysteresis Sh for the predetermined interval S. In the case that the position data Q changes from being a value inside of the predetermined interval St to a value being outside of the predetermined interval St, the determination result changes from OFF to ON. In that case, the lower limit value and the upper limit value of the predetermined interval St are the position data Q=Qa−U−Sh and the position data Q=Qa+U+Sh, respectively.

The lower limit value of the predetermined interval St is lower than the lower limit value of the predetermined interval S by the amount of the hysteresis Sh. The upper limit value of the predetermined interval St is higher than the upper limit value of the predetermined interval S by the amount of the hysteresis Sh. According to the present exemplary modification, it is possible to prevent an unstable state from occurring in which the determination result is repeated between ON and OFF.

Exemplary Modification 4

In the above-described Exemplary Modification 1, the setting unit 176 of the control device 100 sets the predetermined interval S based on the position data Q at the specified position and the predetermined value U. The predetermined value U may be specified by the operator. In the present exemplary modification, the operator operates the setting device 110B (refer to FIG. 5A), which is the external device 110, and thereby inputs a specified value to be set as the predetermined value U. A specified value input signal indicative of the specified value that has been input is input from the setting device 110B to the output terminal 120 of the connector 62.

The specified value input signal that has been input to the output terminal 120 is transferred from the connector 62 to the communication module 104 via the cable 64. Furthermore, the specified value input signal is acquired by the signal acquisition unit 174 (refer to FIG. 3 and FIG. 7) of the control device 100 via the communication line 132. In this manner, the signal acquisition unit 174 acquires the specified value specified by the operator, from the external device 110 (the setting device 110B). The signal acquisition unit 174 stores the specified value that has been acquired, in the storage device 152.

The setting unit 176 of the control device 100 sets the specified value that is stored in the storage device 152, to the predetermined value U. The setting unit 176 sets the predetermined interval S on the basis of the position data Q at the specified position, and the predetermined value U stored in the storage device 152.

Figure 12B:
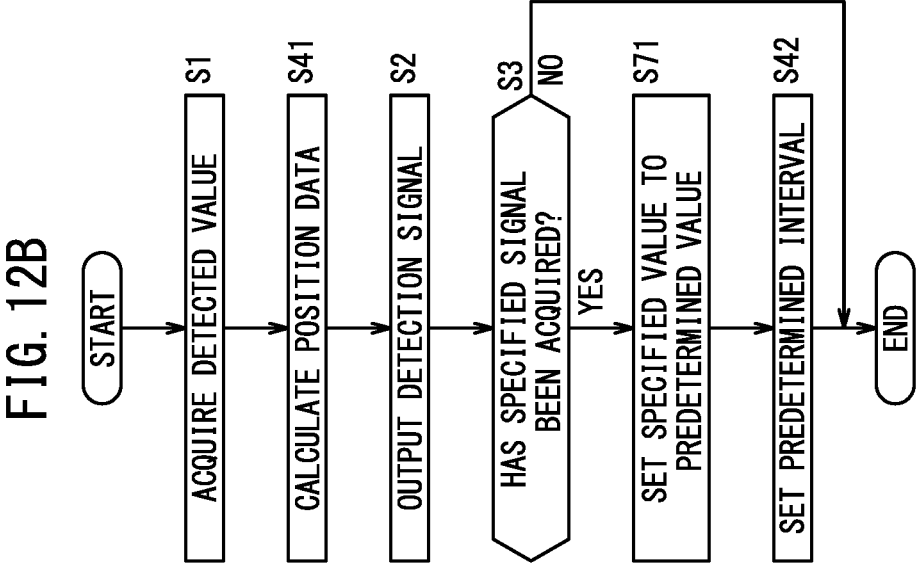
FIG. 12B is a flowchart showing a range setting processing procedure performed by the control device of the position detecting switch.
Figure 12A:
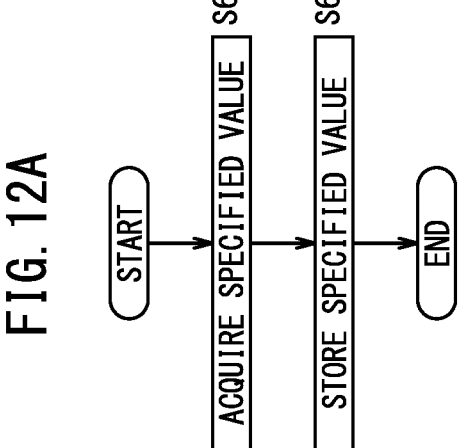
FIG. 12A is a flowchart illustrating a predetermined value setting processing procedure performed by the control device of the position detecting switch according to Exemplary Modification 4.

FIG. 12A is a flowchart illustrating a predetermined value U setting processing procedure performed by the control device 100 of the position detecting switch 10 according to the Exemplary Modification 4. This processing procedure is performed, for example, by the processing circuit 150 included in the control device 100, prior to the range setting processing procedure shown in FIG. 12B, which will be described later.

When the present processing procedure is initiated, in step S61, the signal acquisition unit 174 acquires a specified value input signal from the external device 110, and acquires the specified value specified by the operator. In step S62, the signal acquisition unit 174 stores the specified value acquired in step S61 in the storage device 152. When the process of step S62 is completed, the present processing procedure comes to an end.

FIG. 12B is a flowchart showing a range setting processing procedure performed by the control device 100 of the position detecting switch 10. The present processing procedure is periodically performed, for example, by the processing circuit 150 included in the control device 100, in a setting mode prior to detecting the position of the movable body 86. Among the steps in the processing procedure shown in FIG. 12B, descriptions of those steps which are specified by the same reference numerals as the steps of the processing procedure shown in FIG. 6A or FIG. 9A will be omitted.

In the case it has become YES in step S3, then in step S71, the setting unit 176 sets the specified value that has been stored in the storage device 152 by the signal acquisition unit 174, to the predetermined value U. When the process of step S71 is completed, the present processing procedure proceeds to step S42.

According to the present exemplary modification, the operator becomes capable of setting the predetermined value U in accordance with the manner in which the actuator 20 is used, and the position of the movable body 86 can be detected with appropriate accuracy.

Exemplary Modification 5

The embodiment and each of the exemplary modifications described above may be combined.

Inventions Capable of Being Obtained from the Embodiment

Descriptions will be given below concerning the inventions that can be grasped from the above-described embodiment.

(1) The position detecting switch (10) detects the position of the movable body (86) that is capable of moving in the predetermined direction (M), based on the magnet (88) attached to the movable body. The position detecting switch includes the magnetic sensor (102) that detects the magnetism of the magnet, and outputs the detected value (D, Q) in accordance with the magnetism, the determination unit (172) that determines whether or not the detected value lies within the predetermined range (R, S), and the setting unit (176) that sets the predetermined range centrally around the detected value corresponding to the specified position which is the position (X, Xo, Xc, Xa) of the movable body specified by the operator. In accordance with these features, there is no need to pay attention to the accuracy in the attachment of the magnetic sensor. Accordingly, it is possible to prevent the accuracy in detecting the position from decreasing due to a reduced accuracy in the attachment of the magnetic sensor.

(2) The position detecting switch may further include the signal acquisition unit (174) that acquires the specified signal from the operator, and the setting unit may set the position of the movable body at a time when the specified signal has been acquired, as the specified position. In accordance with this feature, it is possible to set the predetermined range corresponding to a desired specified position.

(3) The signal acquisition unit may acquire the specified signal from the external device (110). In accordance with this feature, the specified position can be determined by operating the external device.

(4) The position detecting switch may further include the output terminal (120, 122) that outputs to the exterior the output signal indicative of the determination result of the determination unit, and the specified signal may be input to the output terminal. In accordance with this feature, it becomes unnecessary to separately provide an input terminal for the specified signal.

(5) The setting unit may set, as the predetermined range, the range of the detected value in which the difference from the detected value corresponding to the specified position lies within the predetermined value (V, U). In accordance with this feature, the predetermined range that is centered on the detected value at the specified position can be set.

(6) The setting unit may set the specified value specified by the operator, to the predetermined value. In accordance with this feature, the operator is capable of setting the predetermined value depending on the manner in which the actuator including the movable body is used.

(7) The setting unit may acquire the specified value from the external device. In accordance with this feature, the predetermined value can be determined by operating the external device.

(8) The position detecting switch may further include the output terminal (120, 122) that outputs to the exterior the output signal indicative of the determination result of the determination unit, and the specified value input signal indicative of the specified value may be input to the output terminal. In accordance with this feature, it becomes unnecessary to separately provide an input terminal for the specified value input signal.

(9) The position detecting switch may further include the output terminal that outputs to the exterior the output signal indicative of the determination result of the determination unit. In accordance with this feature, the determination result concerning whether or not the position of the movable body is at the specified position can be controlled centrally by an external device such as a PLC or the like.

(10) The position detecting switch may be provided with a plurality of the output terminals. In accordance with this feature, it is possible to determine, for each of a plurality of specified positions, whether or not the position of the movable body is at the specified position.

(11) The position detecting switch may further include the position calculation unit (220) that calculates the position data (Q) indicative of the position of the movable body based on the detected value output by the magnetic sensor, and the output terminal may output to the exterior the detection signal indicative of the position data. In accordance with the above features, it becomes easier for the operator to specify the specified position.

(12) The setting unit may set a plurality of the predetermined ranges, and the determination unit may determine whether or not the detected value lies within any one of the plurality of predetermined ranges. In accordance with this feature, a plurality of positions to which the movable body moves can be detected.

(13) The position detecting switch may further include the notification device (70) that issues a notification of the determination result of the determination unit, to the operator. In accordance with this feature, it becomes easier for the operator to visually confirm the determination result concerning whether or not the position of the movable body is at the specified position.

(14) The position detecting switch may further include the position calculation unit (220) that calculates the position data (Q) indicative of the position of the movable body based on the detected value output by the magnetic sensor, and, in the case that the position data indicates that the position of the movable body lies within the predetermined interval (S) centered on the specified position, the determination unit may determine that the detected value lies within the predetermined range, and the setting unit may set the predetermined interval as the predetermined range. In accordance with the above feature(s), it becomes easier for the operator to specify the specified position.

(15) The actuator (20) may include the position detecting switch, the movable body, and the accommodation unit (26) in which the movable body is accommodated in an interior portion thereof, and the position detecting switch may be attached to the outer surface of the accommodation unit. In accordance with these features, the determination result concerning whether or not the position of the movable body is at the specified position can be stably obtained.

(16) The position detecting method of detecting the position of the movable body (86) that is capable of moving in the predetermined direction (M), based on the magnet (88) attached to the movable body, includes the detection step of detecting the magnetism of the magnet by the magnetic sensor (102), the determination step of determining whether or not the detected value (D, Q) detected in accordance with the magnetism lies within the predetermined range (R, S), and the setting step of setting the predetermined range centrally around the detected value corresponding to the specified position which is the position (X, Xo, Xc, Xa) of the movable body specified by the operator. In accordance with these features, there is no need to pay attention to the accuracy in the attachment of the magnetic sensor. Accordingly, it is possible to prevent the accuracy in detecting the position from decreasing due to a reduced accuracy in the attachment of the magnetic sensor.

It should be noted that the present invention is not limited to the embodiment described above, and various alternative or additional configurations could be adopted therein without departing from the essence and gist of the present invention as set forth in the appended claims.

The invention claimed is:

1. A position detecting switch configured to detect a position of a movable body that is movable between a first position and a second position in a predetermined direction, based on a sole magnet attached to the movable body, the position detecting switch comprising:

a sole magnetic sensor configured to detect magnetism of the magnet varying monotonically depending on the position of the movable body in the predetermined direction, and to output a detected value in accordance with the magnetism;

a determination unit configured to determine whether or not the detected value lies within a predetermined range; and a setting unit configured to set the predetermined range centrally around the detected value corresponding to a specified position which is a position of the movable body specified by an operator.

2. The position detecting switch according to claim 1, further comprising:

a signal acquisition unit configured to acquire a specified signal from the operator;

wherein the setting unit sets the position of the movable body at a time when the specified signal has been acquired, as the specified position.

3. The position detecting switch according to claim 2, wherein the signal acquisition unit acquires the specified signal from an external device.

4. The position detecting switch according to claim 3, further comprising:

an output terminal configured to output to an exterior an output signal indicative of a determination result of the determination unit, wherein the specified signal is input to the output terminal.

5. The position detecting switch according to claim 1, wherein the setting unit sets, as the predetermined range, a range of the detected value in which a difference from the detected value corresponding to the specified position lies within a predetermined value.

6. The position detecting switch according to claim 5, wherein the setting unit sets a specified value specified by the operator, to the predetermined value.

7. The position detecting switch according to claim 6, wherein the setting unit acquires the specified value from an external device.

8. The position detecting switch according to claim 7, further comprising:

an output terminal configured to output to an exterior an output signal indicative of a determination result of the determination unit;

wherein a specified value input signal indicative of the specified value is input to the output terminal.

9. The position detecting switch according to claim 1, further comprising an output terminal configured to output to an exterior an output signal indicative of a determination result of the determination unit.

10. The position detecting switch according to claim 9, wherein the output terminal comprises a plurality of output terminals.

11. The position detecting switch according to claim 9, further comprising:

a position calculation unit configured to calculate position data indicative of the position of the movable body based on the detected value output by the magnetic sensor, wherein the output terminal outputs to an exterior a detection signal indicative of the position data.

12. The position detecting switch according to claim 1, wherein:

the predetermined range comprises a plurality of predetermined ranges, and the setting unit sets the plurality of predetermined ranges; and the determination unit determines whether or not the detected value lies within any one of the plurality of predetermined ranges.

13. The position detecting switch according to claim 1, further comprising a notification device configured to issue a notification of a determination result of the determination unit, to the operator.

14. The position detecting switch according to claim 1, further comprising:

a position calculation unit configured to calculate position data indicative of the position of the movable body based on the detected value output by the magnetic sensor;

wherein, in a case that the position data indicates that the position of the movable body lies within a predetermined interval centered on the specified position, the determination unit determines that the detected value lies within the predetermined range; and the setting unit sets the predetermined interval as the predetermined range.

15. An actuator comprising:

the position detecting switch according to claim 1;

the movable body; and an accommodation unit configured to accommodate the movable body in an interior portion of the accommodation unit;

wherein the position detecting switch is attached to an outer surface of the accommodation unit.

16. A position detecting method of detecting a position of a movable body that is movable between a first position and a second position in a predetermined direction, based on a sole magnet attached to the movable body, the position detecting method comprising:

a detection step of detecting, by a sole magnetic sensor, magnetism of the magnet varying monotonically depending on the position of the movable body in the predetermined direction;

a determination step of determining whether or not a detected value detected in accordance with the magnetism lies within a predetermined range; and

19

20 a setting step of setting the predetermined range centrally around the detected value corresponding to a specified position which is a position of the movable body specified by an operator.

* * * * *